April 22, 1924.  
A. GRIEVES  
LEVER MECHANISM  
Filed June 26, 1919  
1,491,009
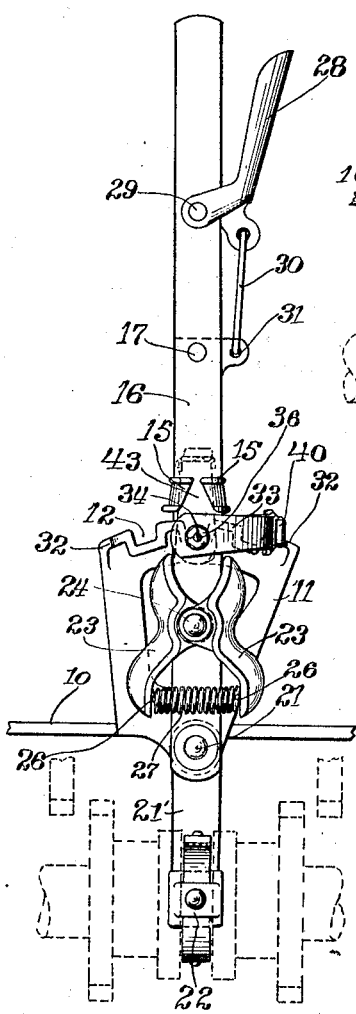
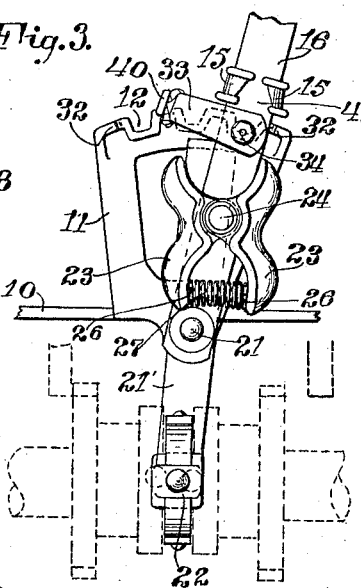
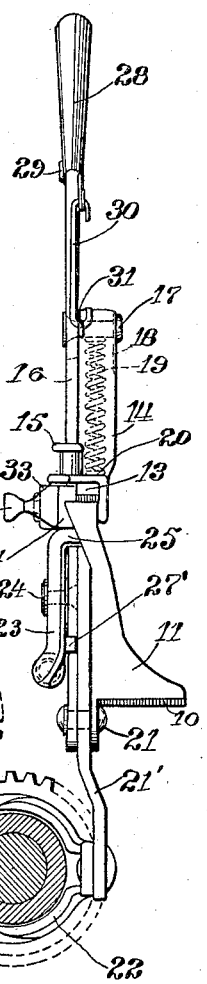
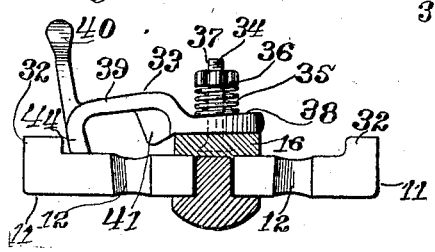
Inventor:  
Albert Grieves,  
By Chas. E. Lord  
Atty.

Patented Apr. 22, 1924.

1,491,009

UNITED STATES PATENT OFFICE.

ALBERT GRIEVES, OF SPRINGFIELD, OHIO, ASSIGNOR TO INTERNATIONAL HARVESTER COMPANY, A CORPORATION OF NEW JERSEY.

LEVER MECHANISM.

Application filed June 26, 1919. Serial No. 306,967.

*To all whom it may concern:*

Be it known that I, ALBERT GRIEVES, a citizen of the United States, residing at Springfield, in the county of Clark and State of Ohio, have invented certain new and useful Improvements in Lever Mechanism, of which the following is a full, clear, and exact specification.

This invention relates to levers.

The use of levers and lever mechanism to shift gears and to shift driving connections for rotating elements of machines from one direction of rotation to the reverse direction of rotation, and to change the driving speeds of the rotating elements is common in all arts. When levers are utilized for thus changing the direction of rotation of moving elements, there is always a tendency to shift the lever from one extreme position to the opposite extreme, thereby changing directly from one direction of rotation or movement to the opposite direction. Where the rotating elements are revolving at high speeds, it will be readily seen that thus changing the direction of rotation from one direction to the opposite direction directly without first throwing the connections into neutral position would often result in injury to the rotating elements and breakage of parts. This is all the more true when the speed of the rotating parts, as well as the direction of rotation, is changed by the movement of the shifting lever.

One familiar example of a change in speed as well as a change in direction of rotation of the operative elements is found in the combined side delivery hay rake and tedder. In this machine, as is well known, the rake or rotating element is revolved in one direction for raking, and in the opposite direction and at greater speed for tedding. It will be seen, therefore, that in this type of machine it is desirable to provide shifting mechanism with means for preventing a direct change in the speed and the direction of movement of the operative elements.

Having the above stated problems in mind, the object of the present invention is to provide safety locking means for preventing a direct change from rotation in one direction to rotation in the opposite direction, and from one speed of rotation to a different speed of rotation.

In the embodiment of the invention illustrated and described in this application, the safety locking means comprises an adjustable locking member carried by the lever and cooperating with a fixed part of the frame, such as the sector, in such a manner as to limit the movement of the lever on its pivot in a given direction.

In the drawings, wherein one embodiment of the invention is illustrated,—

Fig. 1 shows my improved construction in front elevation, one example of gearing which may be shifted by the lever being shown in dotted lines;

Fig. 2 is a side elevational view, partly in section, of the construction shown in Fig. 1;

Fig. 3 is a front elevational view similar to Fig. 1, but showing the lever in one extreme position of adjustment;

Fig. 4 is a side elevational view of the safety locking mechanism showing this mechanism in its central position of adjustment;

Fig. 5 is a transverse view showing the safety locking member in one extreme position of adjustment; and Fig. 6 is a detail view showing in section a portion of the locking member in its neutral position of adjustment.

In the drawings wherein my invention is illustrated, I have shown the locking mechanism in connection with a particular type of lever which will be hereinafter described, but it should be understood that the locking mechanism is adapted for use in connection with other types of levers and is not limited in any way to the type illustrated, this type being shown merely for the purpose of illustrating one practical embodiment of the invention. The lever mechanism will first be described and then a description will be given of the locking mechanism.

Referring to the drawings, I have shown a portion of the frame 10 which may represent any machine, and to this frame there is secured a sector 11 having the usual notches 12 for the reception of a sliding detent or locking member 13. The detent 13 is in this instance formed integral with the casing 14, having forwardly extending lugs 15 which overlap and embrace the main portion 16 of the lever. The securing member or bolt 17 is secured to the portion 16 of the lever and passes through the casing 14, a slot 18 being provided in the outer wall of the casing 14 to permit the reciprocation of the detent 13 and casing 14 on the lever. A spring 19 is enclosed within the casing 14 and bears at one end against the bolt 17 and at its opposite end against the lower wall 20 of the casing 14. It will be seen, therefore, that the spring 19 normally tends to force the casing 14 and detent 13 downwardly into engagement with one of the notches 12 of the sector 11. The portion 16 of the lever is pivoted on a pin 21 carried by the sector 11 and is operatively connected in a manner hereinafter described with a supplemental lever 21'. The supplemental lever is also pivoted on the pivot pin 21 and extends downwardly therefrom, as is clearly illustrated in Fig. 2, and is provided with a clutch or gear shifting fork 22. In the lever illustrated in connection with my invention a resilient connection between the main lever and the supplemental lever is provided, this connection comprising a pair of pivotally mounted dogs 23 pivoted on a pin 24 carried by the portion 16 of the lever. These dogs have formed thereon at their upper ends offset lugs 25 which overlap the portion 16 of the lever and the upper end of the supplemental lever 21'. The dogs 23 have also formed thereon inwardly projected studs 26 between which is mounted a spring 27 which normally tends to force the lower portions of the dogs apart and the upper portion of the dogs together, and into engagement with the lateral edges of the portion 16 of the lever and of the supplemental lever 21'. Means has also been provided for limiting the inward movement of the lower ends of the dogs 23, this means comprising inwardly projecting stops or lugs 27', which overlap the lower end of the portion 16 of the lever. The particular type of lever just described was devised for shifting gears into and out of mesh with each other, and operates in the following manner:

Assuming that the teeth on the gears to be shifted into mesh with each other are not properly positioned to be meshed, when the lever is shifted, for instance, from the neutral position shown in Fig. 1 to the position shown in Fig. 3, the gear which is shifted by the lever cannot immediately mesh with the gear with which it is intended to mesh, and therefore the main portion 16 of the lever and the supplemental portion 21' of the lever will assume the position shown in Fig. 3. In this position it will be seen that the main portion 16 has been shifted to its extreme position in one direction and locked in this position, but that the supplemental lever 21' has not yet been shifted, since the gears could not be immediately moved into mesh with each other. The supplemental portion, however, has been placed under the tension of the spring 27 by means of the pivoted dogs 23. This is accounted for by the fact that the lug 25 of the right hand dog 23 (see Fig. 3) is engaged by the portion 16 of the lever, thereby swinging the right hand pivoted dog 23 in a clockwise direction. This movement is communicated to the left hand pivoted dog through the spring 27, and the lug 25 carried by the left hand dog engages the upper left hand lateral edge of the supplemental lever 21', thereby tending to force the upper end of the lever 21' toward the right and the lower end of the lever 21' toward the left. As soon, therefore, as the rotating gear has moved a sufficient distance to be positioned in the proper rotative adjustment for meshing with the stationary gear, the rotating gear will be forced into mesh with the stationary gear by means of the spring 27.

It is believed that the above description will make the operation of the particular type of lever illustrated clear, and as the safety locking mechanism is equally well adapted to other types of levers, it is not believed that any further reference to this particular type will be necessary.

As is usual with a pawl and sector type of lock, the ordinary releasing mechanism is provided in this case, this mechanism comprising a bell crank lever 28 adapted to be engaged by the hand of the operator and pivoted at 29 to the upper end of the lever. The member 28 is connected by means of a link 30 to an outwardly projecting lug 31 formed integral with or secured to the casing 14 above described. The sector 11 is provided with laterally projecting stops 32, the purpose of which is to limit the pivotal movement of the portion 16 of the lever, and also to co-operate with the safety locking mechanism in preventing the direct shifting of the lever from one extreme position of adjustment to the opposite extreme.

The safety locking mechanism will next be described.

This locking mechanism comprises a pivoted locking member 33 loosely carried by the pivot pin 34 secured to the portion 16 of the lever. This locking member is mounted on the pin 34 for pivotal movement laterally with respect to the lever, and is normally pressed into contact with the outer surface of the lever by means of a compression spring 35 carried by the pin 34 and positioned between a nut 36 on the screw-threaded outer end 37 of the pin 34 and the outer surface 38 of the locking member. As clearly shown in Figs. 4 and 5, the locking member has an offset central portion 39, this offset portion being provided to permit the swinging of the locking member on its pivot and to escape in this swinging motion the lugs 15 carried by the casing 14. On its outer end the locking member is provided with an outwardly projecting handle or lug 40, by means of which it may be shifted from one position of adjustment to another position. Adjacent to its inner end and projecting laterally from the offset portion 33, there is formed a cam-shaped member or lug 41 beveled or rounded on its inner portion, as shown at 42, (Fig. 6). In the central position of adjustment of the lug 41 this lug engages a V-shaped opening 43 formed between the lugs 15, the engagement of the lug 41 with this opening normally maintaining the locking member in its central position of adjustment. When the locking member is disposed in this central position of adjustment, the inwardly projecting portion 44 formed on the outer end of the locking member, will prevent the upward movement of the locking pawl 13 to a sufficient distance to release this pawl from one of the notches 12, since the portion 44 of the locking member overlaps the outer surfaces of the lugs 15, as clearly shown in Fig. 4. Therefore, before the lever can be shifted from neutral position to one or the other extreme position of adjustment, the locking member 39 must be swung toward the right or toward the left (see Fig. 1). Assuming that the operator desires to shift the lever 16 in a clock-wise direction, he must first swing the locking member 39 toward the left or to the position in Fig. 3. When this has been done, the pawl 13 may be lifted from engagement with the central notch 12 in the sector 11, and the lever may then be shifted to its extreme position of adjustment shown in Fig. 3. Assuming that the lever has been so shifted and that the operator desires to shift the lever to the opposite extreme position of adjustment in order to change the direction of rotation or the speed of the elements controlled by the lever, he must first shift the lever to the neutral position, since the engagement of the end 44 of the locking member with the left hand laterally projecting lug 32 carried by the sector will prevent a shifting of the lever from the extreme position shown in Fig. 3 to the opposite extreme position. After the lever has been shifted to the neutral position the operator should throw the locking member from the position shown in Fig. 3 to the position shown in Fig. 1, whereupon the lever may be shifted in an anti-clockwise direction to the extreme position of movement opposite that shown in Fig. 3. It is intended that the shifting of the locking member from one position to another will call to the attention of the operator the necessity of first shifting the lever to neutral position before shifting from one extreme position of adjustment to the opposite position, and will effectively prevent the shifting of the lever from one end of the sector to the other end thereof.

The curvature of the lug 41, as indicated at 42, is such that when the locking member is swung from its neutral position of adjustment, as shown in Fig. 4, laterally in either direction to an extent sufficient to release the lugs 15, casing 14 and pawl 13, the pressure of the spring 35 will force the locking member into one or the other extreme position shown in Fig. 1 or Fig. 3.

From the above description of the construction and operation of the lever, it will be seen that I have provided a simple and efficient locking mechanism, a mechanism which may be readily attached to any of the common forms of levers used for shifting operative parts of machines.

While I have in the above specifications described a single embodiment of my invention and have shown the locking member attached to a particular type of lever, it should be distinctly understood that this embodiment and the type of lever shown in connection therewith were illustrated merely for the purpose of showing a practical construction, and that modifications and changes may be made without departing from the spirit and scope of the invention as expressed by the following claims:

1. In combination, a sector, a lever, means carried by the lever and cooperating with the sector to secure the lever in different positions of adjustment, and means carried by said lever and engageable with said sector for preventing the movement of said lever from one extreme position on said sector to the opposite extreme position.

2. In combination, a sector, a lever, means carried by the lever and cooperating with the sector to secure the lever in different positions of adjustment, and means pivotally mounted on said lever and adapted to engage said sector for preventing the movement of said lever from one extreme position of adjustment to the opposite extreme position.

3. In combination, a sector, a lever, and reversible means pivotally mounted on said lever adapted to engage said sector for preventing the movement of said lever from one extreme position of adjustment to the opposite extreme position.

4. In combination, a toothed sector, a lever, a detent carried by the lever, means for actuating the detent to engage the sector to lock the lever in adjusted position, means pivotally carried by said lever and adapted to engage said sector, and yieldable means engaging said pivoted means and normally positioning said means at an angle with respect to said lever.

5. In combination, a sector, a lever, a pawl carried by said lever and adapted to engage said sector, means for actuating said pawl, and a pivoted member carried by said lever adapted in one position of adjustment to retain said pawl in engagement with said sector and in another position to release the pawl but limit movement of the lever on the sector.

6. In combination, a sector having a laterally extending portion at each end, a lever, and means pivoted on said lever and adapted to engage each of said portions to limit the movement of said lever to one part of the sector.

7. In combination, a sector having laterally extending portions, a lever and reversible means pivotally mounted on said lever and adapted to engage said laterally extending portions and resilient means for holding said reversible means in yielding contact with said lever.

8. In combination, a sector, a lever, a member pivotally mounted on said lever and having an offset end portion and means carried by said sector and adapted to be engaged by said offset end portion when said member is disposed in a predetermined position of adjustment, and limit movement of the lever to one part of the sector.

9. In combination, a sector, a lever, a member pivoted to said lever and having an offset end portion, resilient means for normally retaining said member in a position substantially at right angles to said lever, and means carried by said sector and adapted to be engaged by said member when said member is disposed in a position substantially at right angles to said lever whereby the movement of said lever is limited.

10. In combination, a sector, a lever adapted to swing along the sector, means carried by the lever and cooperating with the sector to secure the lever in different positions of adjustment, and means for limiting the movement of the lever to one portion of the sector when in one position and for limiting its movement to another portion of the sector when the means is in another position.

11. In combination, a sector, a lever adapted to swing along the sector, and means cooperating with the lever and sector to limit movement of the lever to one portion of the sector when in one position and to limit movement of the lever to another portion of the sector when in another position and to prevent movement of the lever when in a third position.

In testimony whereof I affix my signature.

ALBERT GRIEVES.